United States Patent [19]
Munz et al.

[11] Patent Number: 5,708,818
[45] Date of Patent: Jan. 13, 1998

[54] METHOD AND APPARATUS FOR REAL-TIME OPERATION OF A PROCESSOR

[76] Inventors: Heinrich Munz, Rossberger Strasse 4, D 88368 Bergatreute; Josef Leibinger, Wolfeggerstrasse 50/1, D 88250 Weingarten, both of Germany

[21] Appl. No.: 393,399

[22] Filed: Feb. 23, 1995

[30] Foreign Application Priority Data

Feb. 25, 1994 [DE] Germany .......... 44 06 094.7

[51] Int. Cl.$^6$ .......... G06F 9/46; G06F 13/14
[52] U.S. Cl. .......... 395/740; 395/734; 395/739; 395/741; 395/868; 395/733; 395/80; 395/82
[58] Field of Search .......... 395/733, 739, 395/740, 735, 737, 82, 84, 99, 868

[56] References Cited

U.S. PATENT DOCUMENTS

| | | | |
|---|---|---|---|
| 5,317,747 | 5/1994 | Mochida et al. | 395/733 |
| 5,349,667 | 9/1994 | Kanedo | 395/740 |
| 5,355,490 | 10/1994 | Kou | 395/700 |
| 5,471,620 | 11/1995 | Shimizu et al. | 395/733 |
| 5,555,413 | 9/1996 | Lohman et al. | 395/733 |
| 5,566,334 | 10/1996 | Loader | 395/739 |
| 5,568,643 | 10/1996 | Tanaka | 395/739 |

FOREIGN PATENT DOCUMENTS 3335549  9/1983  Germany .
3726659  8/1987  Germany .

OTHER PUBLICATIONS

Higdon et al, Programmable, Expandable Interrupt Controller, IBM Technical Disclosure Bulletin, vol. 24 No. 5, Oct. 1981.
Interrupt Controller Diagnostic Wrap Arrangement, IBM Technical Disclosure Bulletin, vol. 29, No. 9, Feb. 1987.
Hall et al, Multiple Interrupt Registration, IBM Technical Disclosure Bulletin, vol. 26 No. 1, Jun. 1983.
Garrow et al, 16–Bit Single–Board Computer Maintainns 8–Bit Family Ties, Electronics, pp. 105–110, Oct. 12, 1978.

Primary Examiner—Jack B. Harey
Assistant Examiner—Raymond N. Phan
Attorney, Agent, or Firm—Browdy and Neimark

[57] ABSTRACT

The hard-wired non-maskable interrupt (10) of a conventional processor (7), i.e. NMI or IOCHCK, is used to bypass programed interrupts to obtain immediate, predictable access to the processor and avoid the long and uneven access times of programmed interrupts. The NMI interrupts are controlled by a programmable distributor (8). This allows the conventional computer system to operate on a real-time basis, since all the interrupts take the same time.

6 Claims, 1 Drawing Sheet

METHOD AND APPARATUS FOR REAL-TIME OPERATION OF A PROCESSOR

FIELD OF THE INVENTION

The invention relates to a method and an apparatus for real-time operation of a processor as generically defined by the preamble to claim 1.

DESCRIPTION OF THE RELATED TECHNOLOGY

It is stated in the periodical article by Dr. Mathias Schramm and Peter Siering, "Blitz ohne Donner, Hardware-Interrupts unter Windows" [Lightning but no Thunder: Hardware Interrupts in Windows], c't 1994, No. 2, pp. 188–191, that under the Windows operating system, there is virtually no real-time operation in the sense of the DIN definition.

This DIN definition is to designate the reactions of a computer system to external interrupts within a predetermined (brief) time. An important term, which characterizes the capacity and performance of a system, is the interrupt latency period. This typical system constant describes the maximum time that can elapse between an external request (interrupt request) and the reaction of the control program. In measurement technology, depending on any special request, it is in the range from a few microseconds to a few milliseconds.

If external hardware sets an interrupt line of the 8259 A programmable interrupt controller to logical "high", then this controller sends the associated vector number (0–255) to the processor, which in turn initiates the call of the particular handling routine. In MS-DOS, this process takes from 12 to 15 µs; in Windows, however, the interrupt routine does not directly come about. Portions of the virtual interrupt controller driver (VPICD) are called up for initialization, which typically lengthens the interrupt latency period to approximately 50 µs. The arrival of higher-priority interrupts, for example from a timer or network, can interrupt the course of initialization, so that in systems with heavy demands on them, it can happen that these periods are exceeded greatly.

It was therefore impossible until now, in the Windows operating system, to define a constant interrupt latency period, since the system reacted variously quickly to different interrupt requests.

Until now, the situation has been that the internal hardware interrupt sources could be masked by a software command; this means that these interrupt sources are not processed when the software requests it. For software reasons, this leads to an unpredictable latency time, which until now prevented real-time operation in the Windows operating system.

This disadvantage also applies to all the other operating systems not capable of real-time operation, such as DOS, UNIX, Windows-NT, and others, such as Macintosh.

SUMMARY OF THE INVENTION

Accordingly, the present invention has an object, among others, to overcome deficiencies in the prior art such as noted above.

The object of the present invention is therefore to propose a method, and an apparatus suitable for performing the method, with which it is possible to guarantee a maximum interrupt latency time.

The fundamental concept is to lend a PC that is operating with a "normal" operating system (BS), which is not capable of real-time operation (in this case, MS Windows 3.1), a guaranteed real-time capability (in the microsecond range), so that machine controls can as it were be allowed to run in the background of Windows.

For the first time, this now assures that the reaction of a system to a hardware interrupt can be accurately predicted, so that such a system is now real-time-capable according to the invention, along the lines of the DIN definition.

Although the interrupt latency time may vary depending on the processor system and on the operating system used, nevertheless for a particular processor running under a particular operating system, it will always be predictable.

According to the invention the so-called NMI (non-maskable interrupt) is employed in order to attain the stated object.

That is, the NMI is used in order to gain immediate, predictable access to the processor.

The operating system may specifically inhibit the normal hardware interrupt sources of an 80×86 CPU for a period of unknown length, particularly when running through the BIOS. According to the invention, however, the NMI of an 80×86 CPU is accessible on the PC bus via the IOCHCK (input-output channel check) signal.

This means that according to the invention, the so-called NMI, which in the case of an AT bus occupation is also called the input-output channel check (IOCHCK), is employed as an interrupt source for real-time requests.

However, the signal is present not only on the AT bus or the ISA bus, but also on older PC bus systems.

According to the invention, this signal is accordingly used to enable carrying out real-time operation of the CPU.

The invention is not limited to the bus systems described, however, but can instead be used for arbitrary bus systems, such as the VESA bus or the Local bus.

Even if one has a self-contained computer without any external bus system, one can use this signal to bring about real-time capability of the processor.

With the present invention, it is accordingly possible for the first time to use the so-called PC processors for control applications, which was previously reserved to its own computer family, such as the 68000 type.

Until now, the possibility of using other hardware interrupt sources than the sources previously known to interrupt the processor had not been thought of, and the invention for the first time contemplates that a signal line not usable as the hardware interrupt source and actually used only for internal purposes can actually be employed as a hardware interrupt source.

An apparatus for performing the method of the invention provides that a hardware interrupt source is connected directly to the signal line of the NMI (IOCHCK). Such a hardware interrupt source may for example be an arbitrary plug-in circuit board, by way of which real-time data processing is controlled.

In a further feature of the apparatus according to the invention, it is provided that the hardware interrupt sources are controlled via a so-called programmable distributor in such a way that depending on the programming of the distributor, either the normal, external hardware interrupt sources gain access to the processor, or selectively—as a function of the program—the novel NMI signal is activated and accesses the processor directly.

A programmable distributor of this kind accordingly chooses, from a number of external hardware interrupt sources, those that are to gain access to the processor.

The NMI according to the invention is then formed of one or more of these hardware interrupt sources, by being connected quasi-directly by electroplating to one or more of these hardware interrupt sources.

Instead of the electroplated connection, a software switchover from hardware interrupt sources to this NMI via a logical network is preferably contemplated.

It may be contemplated that the programmable distributor also be provided with a certain memory capacity, so that it can hold and store the arriving hardware interrupt signals at a certain logical level for a certain period of time.

Accordingly, the interrupt lines that are available on the bus are located both on the interrupt controller of the motherboard and on an IRQ router (interrupt source router). This router is achieved in the form of an additional card. By software it can be determined whether and which of the interrupts present on the bus are to be "rerouted" in an NMI (non-maskable interrupt). The NMI generated by the IRQ router reaches the 80×86 processor via the IOCHCK signal, which is likewise present on the bus.

BRIEF DESCRIPTION OF THE DRAWINGS

The invention will be described in further detail below, in conjunction with drawings which show merely one possible mode of execution. Further characteristics essential to the invention and advantages of the invention will become apparent from the drawings and their description. The drawings schematically show the block circuit diagram of a so-called IRQ router (interrupt source distributor).

The FIGURE is a schematic view of the invention.

DETAILED DESCRIPTION OF THE PREFERRED EMBODIMENT

Figure 1:
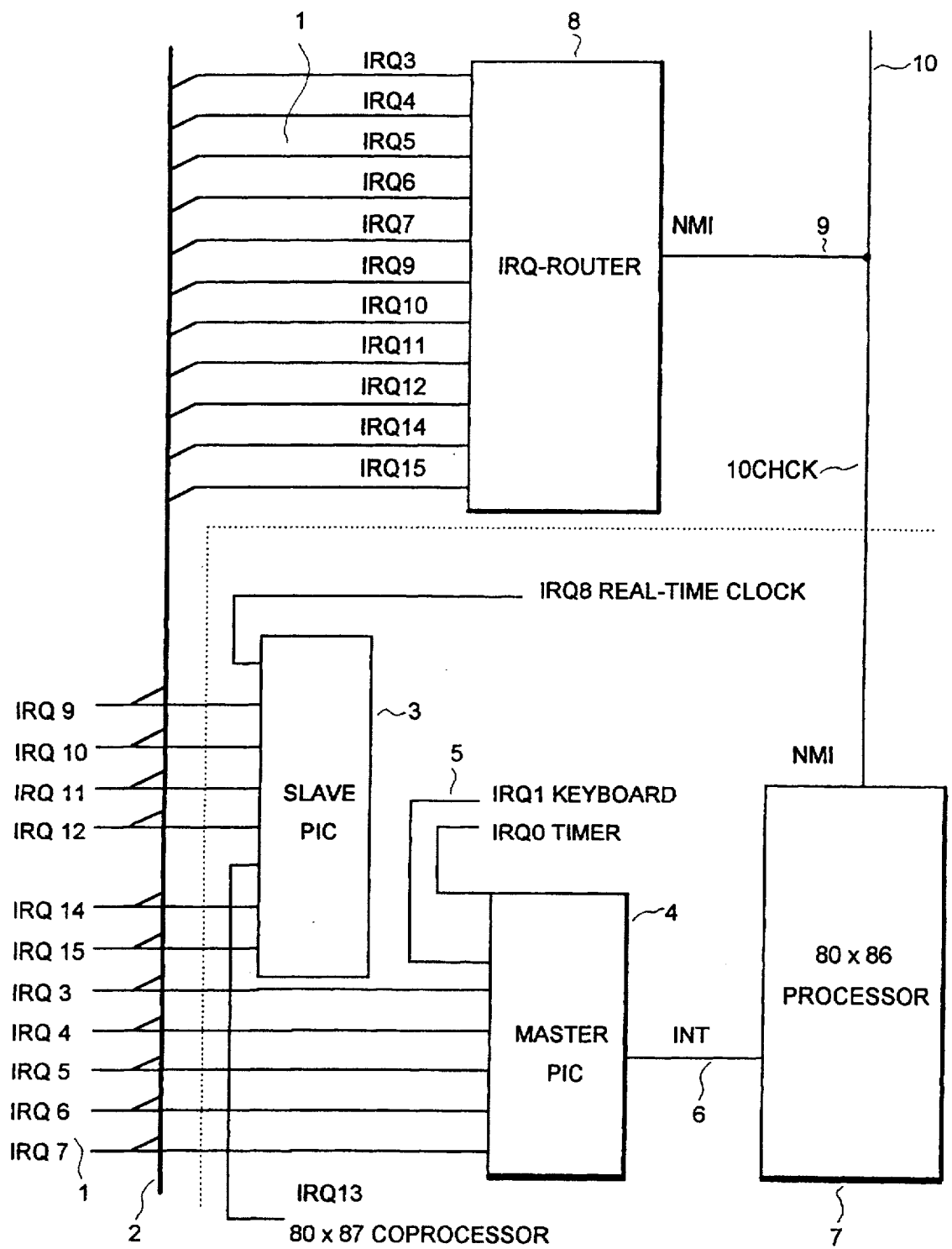

In the lower half of the drawing (below the dashed line), the interrupt hardware is shown that is normally already present in a processor system, and in the upper half, the additional hardware according to the invention, in the form of the IRQ router, is shown.

In a PC bus 2, a number of external hardware interrupt sources IRQ . . . (see drawing, on the left) are carried.

Some of these hardware interrupt sources 1 are delivered via a first interrupt controller 3 to a second interrupt controller 4, or else these sources are delivered selectively to the second interrupt controller.

The second interrupt controller 4 generates a signal, which is delivered to the processor 7 via the so-called maskable interrupt pin 6. In this way, an interrupt can be generated at the processor 7, which can be turned off by a software command.

According to the invention, it is now provided in a first circuit, not shown in detail, that an external hardware interrupt source is connected directly to the line 10, and this line is coupled to the so-called NMI. This signal line brings about an immediate interrupt at the processor, regardless of any software command present.

In a further feature of an apparatus according to the invention, it is provided as shown in the drawings that the hardware interrupt sources are carried out of the PC bus 2 and delivered to a so-called IRQ router (distributor 8).

This distributor 8 is programmable and decides which hardware interrupt source is allowed to be connected to the line 10 with the non-maskable interrupt 9.

As soon as a signal appears on this line 10, the processor is interrupted unconditionally, regardless of whether an interrupt is inhibited or not by software.

This means that in accordance with a signal on the line 10, the processor 7 is capable of real-time operation, since it can carry out an interrupt at arbitrary moments.

What is claimed is:

1. A method for operating a conventional processor including a non-maskable interrupt line, the interrupt input being able to restart the processor in case of using a control program running on the processor; the method comprising the steps of:

operating the processor under a non-real timeable operating system;

controlling an external machine control application with the control program running on the processor; and supplying an external control request to the non-maskable interrupt line from the external machine to the processor;

whereby real time activation of the control program brings about real time capability of the processor.

2. A method for controlling an application of an external machine, comprising:

controlling the application by a control program running on a processor operated under a non-real timable operating system with a non-maskable interrupt line;

supplying an external control request to the non-maskable interrupt line from the external machine to the processor; and bringing about real time capability of the processor by real time activation of the control program.

3. An apparatus for the control of an external machine application by a control program, comprising:

a computer comprising a processor (7) including a non-maskable interrupt line (NMI) and means for running under a non-real timable operating system;

an application connecting line (1, 2, 9, 10) including means for transferring an external control request to the control program;

means for passing the connecting line to the non-maskable interrupt line (NMI) of the processor; and means for bringing about real time capability of the processor by real time activation of the control program.

4. The apparatus according to claim 3, comprising:

means for the interrupt line to restart the processor in case of using the control program running on the processor; and means for supplying an external control request to the non-maskable interrupt line from the external machine to the processor.

5. The apparatus according to claim 3, comprising:

means for bringing about a real-time activation of the control program.

6. A method of using a processor running under a non-real timable operating system having a non-maskable interrupt line for controlling an external machine application by a direct access of an external control request thereof to an external application control program thereof, the control program comprising the step of supplying an external control request to the non-maskable interrupt line from the external machine to the processor for real-time activation of the control program.

* * * * *